United States Patent Office 3,371,184
Patented Feb. 27, 1968

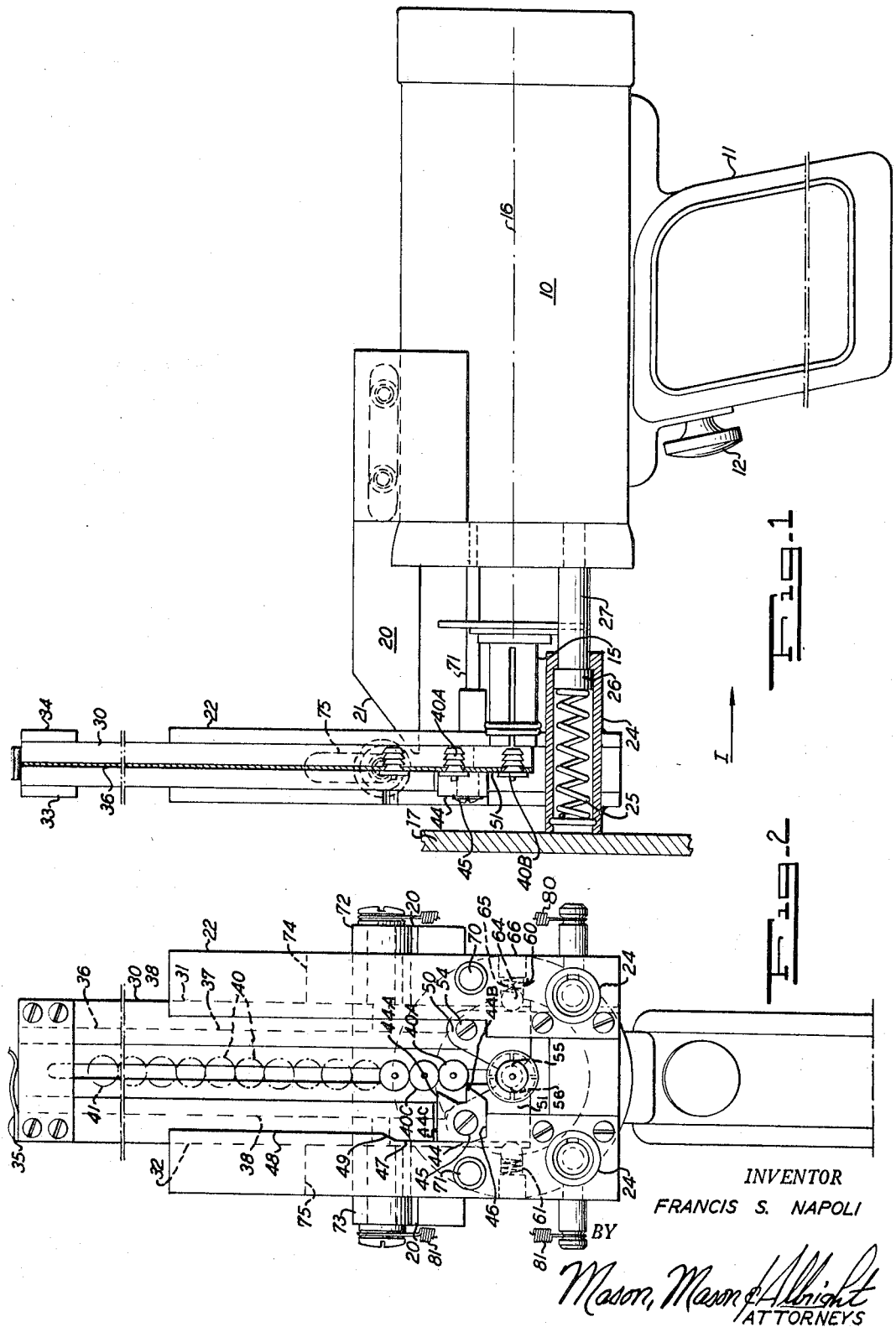

3,371,184
CARTRIDGE TYPE MAGAZINE FEEDER FOR WELD STUDS
Francis S. Napoli, Troy, Mich., assignor to Lattner Bros. Machining Co., Ferndale, Mich., a partnership
Filed Oct. 14, 1963, Ser. No. 316,071
2 Claims. (Cl. 219—98)

ABSTRACT OF THE DISCLOSURE

A stud welding gun having a cartridge of studs attached on the front of the gun whereby the studs are automatically fed to the collet of the gun as the gun is actuated by moving same against the panel to which the studs are welded.

Summary and objects of the invention

The present invention relates to a new and novel cartridge type magazine feeder for weld studs to be utilized in combination with a stud welding gun. More particularly, it relates to such a feeder wherein a cartridge containing a plurality of weld studs is inserted into the magazine and the studs are fed, one by one, to the stud weld gun automatically by the actuation of said gun.

Front loading welding units of the prior art have been difficult to load with welding studs because the stud holder is frequently kept at a position adjacent to the workpiece after welding with the consequence that there is insufficient space in which to front-load such a holder with welding studs. Also, the front-loading of present holders requires a manipulation by the operator which is time-consuming and sometimes a cause of error.

The combination of the present invention overcomes the foregoing disadvantages by the provision of a magazine holder which is movable along the longitudinal axis of the collet of the stud welding gun and contains a cartridge with a plurality of weld studs which can be positioned, one by one, in front of the collet. The holder for the magazine together with the magazine is movable along the longitudinal axis of the collet whereby the collet grasps the weld stud positioned in front of it and carries it forward to effect the weld. The relative movement between the magazine holder and the gun actuates a cam means whereby the magazine together with the cartridge containing the stud welds is raised relative to the gun. When this occurs an escapement with a pair of positioning fingers carries one of the weld studs to a predetermined position wherein when said magazine holder returns to its position in front of the collet with the magazine lowered within the holder, the weld stud involved is positioned directly in front of the collet.

Accordingly, it is an object of this invention to provide a device of the kind set forth whereby the actuation of the weld gun automatically brings a further weld stud positioned in front of the collet of the weld gun for the next welding operation without additional manipulation by the operator.

It is a further object of this invention to provide in a device of the type set forth an insert cartridge containing a plurality of weld studs, which can be inserted and removed from the magazine with facility.

It is a still further object of the invention that the above-mentioned cartridge be inserted in a magazine which is so disposed on the nosepiece of a portable stud welding gun as to become part of the electrical ground circuit for said unit.

It is another object of this invention to provide in the combination set forth, a magazine which has connected to it an escapement and a set of fingers, the escapement mounted on the magazine in such a manner whereby is restricts the feeding of weld studs within the cartridge to the gun and the fingers operate to hold a weld stud in proper position before the collet prior to the welding operation.

It is a yet further object of this invention that one stud be released at a time to the positioning fingers through actuation caused by the forward motion of the combination which is utilized to weld a weld stud in place, there being a cam riser attached to the stud welding gun to actuate a cam roller which in turn causes the magazine to move upward. In the upward position the escapement opens to advance a stud into the positioning fingers, where, upon return of the magazine to its lower position, a stud is provided ready to weld.

Additional objects and advantages of the invention will be apparent to those skilled in the art with reference to the following detailed description of a preferred embodiment of the invention and to the attached drawings, of which:

Brief description of the drawings

FIGURE 1 shows a side view in partial section of the stud welding gun in combination with the insert cartridge type magazine feeder for weld studs in accordance with the present invention; and FIGURE 2 is a front elevational view of the combination shown in FIGURE 1.

Description of the preferred embodiment

The reference character 10 designates a standard stud welding gun of the portable type having a handle 11 and an actuating plunger 12. A collet 15 extends forward of the body of the stud welding gun 10.

Rigidly connected to the upper side of the stud welding gun 10 is a cam riser 20. It will be noted that the cam riser 20 extends forward of the body the stud welding gun 10 and has a biased edge 21 at its forward aspect. With reference to FIGURE 2, it will be noted that there are two similar cam risers 20 extending forward from each side of the stud welding gun 10. A magazine holder 22 is firmly attached to sleeves 24 which each contain a helical coil compression spring 25. When the magazine holder 22 together with the sleeve 24 moves in a direction denoted by the arrow I, the spring 25 compresses against the terminal portion 26 of a rod 27 which is rigidly connected to the stud welding gun 10 and extends forward therefrom parallel to the longitudinal axis 16 of the stud welding gun 10. Such movement is brought about by forcibly pressing the stud welding gun 10 in a direction opposite from arrow I against a panel 17 or the like which abuts on the forward end of sleeve 24.

The magazine holder 22 holds the magazine 30 in a pair of tracks or grooves 31 and 32 in which it is slidable within certain limits which will be discussed subsequently. Connecting pieces disposed at the top of the magazine 30 comprising plates 33 and 34 connect the magazine 30 at its upper end. A leaf spring 35 holds the magazine or cartridge insert 36 in place. The magazine insert 36 is received in grooves or slots 37 and 38 of the magazine 30. A plurality of studs 40 are disposed in a longitudinal opening 41 in the magazine insert 36. An escapement 44 is secured to the magazine 30 by a shoulder bolt 45 or other suitable means. It is to be appreciated that the escapement 44 is rotatable about the bolt 45 within limits.

As shown in FIGURE 2, the escapement 44 rests against an abutment 46 of magazine holder 22. It will be noted that edge 47 of the magazine holder 22 is set in from the edge 48 and they are joined by a biased surface 49. The escapement 44 includes an upper extension 44A and a lower extension 44B. A stud designated 40A is prevented from making a downward movement by the lower extension 44B.

In the same plane as the magazine insert 36 and flush with the lower edge of same, a pair of positioning fingers 50 and 51 are provided. The positioning finger 51 pivots about the bolt 45 within narrow limits and the positioning finger 50 pivots about a bolt or the like 54. Fingers 50 and 51 include facing gripping surfaces 55 and 56, respectively, which, as shown in FIGURE 1, grasp a weld stud 40B. On the side of such fingers 50 and 51 opposite from said gripping surfaces, a pair of detent members 60 and 61 resiliently urge the fingers 50 and 51 into a gripping engagement with the weld stud 40B. The detent members 60 and 61 are of the ball bearing type and comprise, as shown for 60, a ball bearing 64, a compression spring 65, and a backing stud 66, all of said parts contained within the magazine holder 22.

The magazine holder 22 also has bores which slidably receive a pair of guide means 70 and 71. The guide means 70 and 71 are parallel to the longitudinal axis 16 of the stud welding gun 10 and are rigidly connected to the forward portion of the latter.

Connected to the magazine 30 on both sides thereof are a pair of cam rollers 72 and 73 which extend through a pair of guide slots 74 and 75 through both sides of the magazine holder 22.

In operation, when the operator brings the stud welding gun 10 against a panel 17, the sleeve 24 moves to the rearward and carries with it the magazine holder 22. The collet 15 grasps the weld stud 40B and approximately at the same time the biased edges 21 of the cam risers 20 engage the cam rollers 72 and 73 causing the magazine 30 together with the insert cartridge 33, the escapement 44 and the positioning fingers 50 and 51, to move upward. It will be noted that the fingers 50 and 51 will move to a position where the detent members 60 and 61 no longer urge them into a gripping relationship with the weld stud 40B. At the same time, such weld stud is firmly grasped by the collet 15 which moves forward relative to the sleeve 24, the magazine holder 22, etc., supported by the sleeve 24. As the relative movement continues, the escapement 44 has its surface 44C brought in contact with the biased surface 49 of magazine 30. This causes the escapement 44 to rotate in a clockwise direction as seen in FIGURE 2, and stud 40A is thereby positioned between the gripping surfaces 55 and 56 of the fingers 50 and 51. When the welding of weld stud 40B onto panel 17 is completed, the sleeve 24 together with the magazine holder 22 returns to its original position by releasing force on the gun 10. With this, the cam rollers 72 and 73 return to the position shown in the figures by extension springs 80 and 81, and when the escapement 44 comes into contact with the abutment 46 the stud 40C which is above stud 40A takes the place previously occupied by the stud 40A.

Accordingly, it will be recognized that by merely pressing the stud welding gun 10 against the surface to which the studs 40 are welded, studs are fed successively to the collet 15 until all of the studs 40 in the magazine insert 36 have been used up.

The magazine insert 33 may be made of metal, plastic, cardboard, or the like and may be used in various lengths to satisfy the requirement of studs for each load. The cartridges can be returned on an exchange basis or disposed of after use as desired. If desired, the magazine insert may be connected to a central feed station.

The foregoing detailed description has been given for clearness of understanding only, and no unnecessary limitations should be understood therefrom, for modifications will be obvious to those skilled in the art.

Having thus described my invention, what I claim as new and desire to secure by Letters Patent of the United States is:

1. In combination with a stud welding gun including a stud holding collet, an insert cartridge type magazine for weld studs which comprises a magazine holder, means slidably connecting said magazine holder to said gun whereby said magazine holder is movable along the longitudinal axis of said stud holding collet, said collet being movable from a position behind said magazine to a position forward of said magazine, resilient means urging said magazine holder forward of said gun, a magazine slidably held by said magazine holder, said magazine carrying a plurality of weld studs, cam means cooperating between said gun and said magazine whereby when said magazine moves towards said gun said magazine is raised relative to said magazine holder and when said magazine moves away from said gun said magazine is lowered relative to said magazine holder, and an escapement connected to said magazine, said escapement being movable from a first position to a second position, a pair of positioning fingers operatively associated with said escapement, said escapement being changed from said first position to said second position when said magazine moves towards said gun, said escapement engaging a weld stud of said plurality of weld studs, said weld stub being transferred by the movement of said escapement means from its first position to its second position to said pair of positioning fingers when said magazine is raised relative to said magazine holder, and said weld stud being positioned in said positioning fingers forward of said collet when said magazine is lowered relative to said magazine holder.

2. In combination with a stud welding gun including a stud holding collet, an assembly for feeding weld studs to said collet which comprises a magazine holder, vertical guide means included on said magazine holder, said magazine holder being vertically disposed relative to said gun, extension means from said gun slidably connecting said magazine holder to said gun whereby said magazine holder is movable along the longitudinal axis of said stud-holding collet, said collet being movable from a position behind said magazine holder to a position in forward of said magazine holder, resilient means urging said magazine holder forward of said gun, a magazine slidably received in said vertical guides of said magazine holder, an insert cartridge received by said magazine, said cartridge containing a plurality of weld studs, cam means connected to said gun and extending forwardly therefrom, cam engagement means connected to said magazine, said cam means engaging said cam engagement means when said magazine moves towards said gun, said magazine being raised by the engagement between said cam means and said cam engagement means by the aforesaid movement of said magazine towards said gun, escapement means connected to said magazine, and actuation means associated with said escapement means whereby said magazine is raised relative to said gun a weld stud is moved to a predetermined position in said magazine and when said magazine is lowered relative to said gun said weld stud is moved from said predetermined position to a position directly forward of said collet.

References Cited

UNITED STATES PATENTS 3,299,248   1/1967   Meyer _____ 219—98

FOREIGN PATENTS 806,526   12/1958   Great Britain.

RICHARD M. WOOD, *Primary Examiner.*

R. F. STAUBLY, *Assistant Examiner.*